Patented Dec. 4, 1951

2,577,704

UNITED STATES PATENT OFFICE 2,577,704

PROCESS OF DRYING PLUMS AND GRAPES

Earl W. Flosdorf, Forest Grove, Pa., assignor to Tabor-Olney Corporation, Baltimore, Md., a corporation of Maryland No Drawing. Application March 9, 1950, Serial No. 148,735

1 Claim. (Cl. 99—199)

This invention relates to improvements in the production of dried plums and grapes which when reconstituted for use recover substantially their original color and appearance and may even acquire an improved flavor.

It has heretofore been proposed to dry plums and grapes by the method now commonly referred to as freeze-drying, i. e. by first freezing the fruit, either as a whole or cut into sections and then removing the water from the frozen fruit by sublimation. Plums and grapes so treated, however, have been unsatisfactory. The skin, upon such treatment, wrinkled to such a degree that it would not reconstitute properly when water was again added. The flavor of the product changed and color effected. The resultant product after it was reconstituted differed substantially from the fresh fruit and was undesirable. These objections are due in some measure to the fact that some of the fruit juices issue through the skin during the drying step of the freeze-drying process as a low melting eutectic syrupy concentrate. This concentrate dries to a hygroscopic globular type of solid on the surface of the skin, causing the undesirable wrinkles. The product itself is altered from its original condition because of this eutectic separation. Further, as plums or grapes are cut into segments, oxidation occurs on the exposed surfaces during the freeze-drying process, which oxidation effects both flavor and color.

The object of the present invention is to secure the advantages of the freeze-drying method of preparing dried plums and grapes without injury to the fruit so treated. In accordance with the present invention the plums or grapes to be dried by the freeze-drying technique are cut into halves or smaller sections as desired. As soon as possible after cutting the fruit, ascorbic acid is finely dusted over the cut areas in such a way that a substantial portion of the cut areas are coated with such ascorbic acid. After such dusting, the fruit is frozen in the conventional manner and the fruit is then introduced into a vacuum chamber, and the pressure in the chamber is reduced to a value below 3.5 mm., heat being supplied by circulating a heat medium through the jacket of the vacuum chamber, through spaces provided in the shelves in the chamber or in other known ways. As a result of the application of a vacuum and the supply of heat, the water contained in the frozen fruit is removed by sublimation. At the end of the process the water content of the product does not exceed 5% and advantageously is less than this, e. g. 1 to 2% or even less. In order to avoid undesirable reaction during the freeze-drying process, the fruit should preferably be supported on stainless steel trays which have the advantage of permitting good heat conduction and withstanding the effects of temperature changes and fruit acids.

The dried plums and grapes so obtained are stable and may be kept for long periods of time at ordinary temperatures without deterioration when packaged in ordinary glass jars or conventional type cans. No special precaution such as hermetically sealed containers or the use of vacuum or inert gas is required. This permits the fruit to be marketed economically and simply.

Upon the addition of water to the dried fruit, the plums or grapes may be reconstituted to the substantial equivalent of fresh plums or grapes having generally the same appearance and color as fresh fruit and with the additional advantage, in some cases, of having an improved flavor. Thus, plums or grapes of inferior grades which, ordinarily have low market demand are, after processing in accordance with my invention, equal to fruits of better grades so that the user may have the advantage of a superior product at the cost of a less desirable product.

I claim:

The process of producing dried plums and grapes which on the addition of water reconstitute to the substantial equivalent of the fresh fruit, which comprises cutting fresh fruit into sections, dusting ascorbic acid over the cut areas, freezing the fruit and removing the water from such frozen fruit by use of high vacuum.

EARL W. FLOSDORF.

REFERENCES CITED

The following references are of record in the file of this patent:

UNITED STATES PATENTS

| Number | Name | Date |
|---|---|---|
| 2,400,748 | Flosdorf | May 21, 1946 |
| 2,475,838 | Johnson et al. | July 12, 1949 |

OTHER REFERENCES

"Processing Frozen Fruit With 1-Ascorbic Acid" by Hoffman-LaRoche, 1946, pages 12, 14, 16.

Vitamin C Stability in Frozen Fruit, 1946, by Banerfeind et al.